June 20, 1939.  R. GUNN  2,162,710

APPARATUS AND METHOD FOR DETECTING DEFECTS IN METALLIC OBJECTS

Filed Aug. 5, 1936   2 Sheets-Sheet 1

INVENTOR
ROSS GUNN
BY
ATTORNEY

June 20, 1939.  R. GUNN  2,162,710
APPARATUS AND METHOD FOR DETECTING DEFECTS IN METALLIC OBJECTS
Filed Aug. 5, 1936   2 Sheets-Sheet 2

INVENTOR
ROSS GUNN
BY
ATTORNEY

Patented June 20, 1939

2,162,710

UNITED STATES PATENT OFFICE 2,162,710

APPARATUS AND METHOD FOR DETECTING DEFECTS IN METALLIC OBJECTS

Ross Gunn, Washington, D. C.

Application August 5, 1936, Serial No. 94,369

23 Claims. (Cl. 175—183)

(Granted under the act of March 3, 1883, as amended April 30, 1928; 370 O. G. 757)

My invention relates to an apparatus and method for detecting defects in metallic objects.

It is an object of my invention to provide an electrical apparatus for detecting defects in metallic objects, this being attained by the provision of instrumentalties for inducing eddy currents of a predetermined distribution in the object to be tested and the provision of further instrumentalities for noting any departure from the predetermined distribution whereby to indicate the presence of a defect.

A further object of my invention resides in the provision of an electrical apparatus for detecting the approximate depth of a defect below the surface of a metallic object being tested.

It is another object of my invention to provide a new and novel method for detecting the presence of a defect in metallic objects by studying departures from a predetermined distribution of eddy currents induced in the object under test to thereby indicate the presence of a defect.

It is another and further object of my invention to provide a new and novel method for determining the approximate depth of a subsurface defect or the approximate difference in depth between subsurface defects in the metallic object being tested.

These and other objects will be readily appreciated as the invention becomes better understood by reference to the following detailed description and drawings, wherein.

Figure 3:
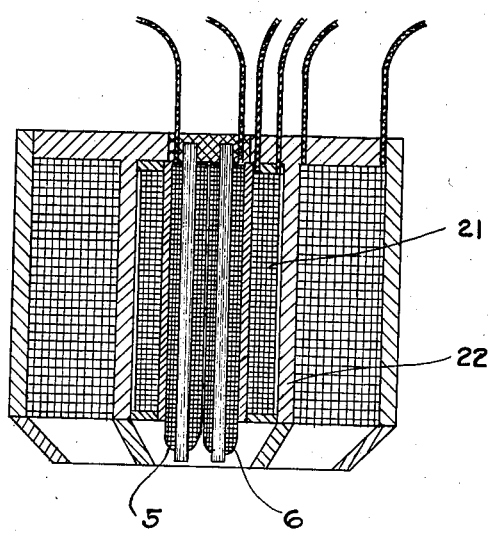
Figure 4A:
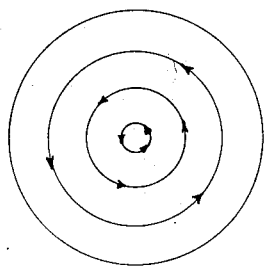
Figure 4B:
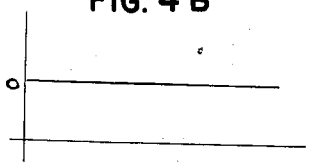
Figure 5A:
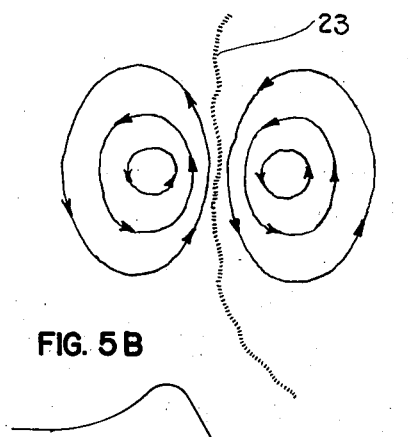
Figure 5B:

Fig. 3 discloses a further embodiment of my exploring unit;

Figs. 4A and 4B show, respectively, a symmetrical distribution of eddy currents in a homogeneous portion of the object under test and the accompanying deflection in the indicator of the apparatus; and Figs. 5A and 5B show, respectively, a distorted distribution of the eddy currents in the object under test occasioned by the presence of a defect and the indicator deflection curve obtained by moving the exploring unit over the defect in the object.

My invention is based upon the principle that a system of eddy currents induced in metallic objects will be symmetrical in character if no inhomogeneities are present therein, but if any inhomogeneity is present the symmetrical pattern of eddy currents will be distorted. By noting the distortion in the electromagnetic fields accompanying the eddy currents, I am able to determine accurately and effectively the presence of any defect. My apparatus and method can be used with magnetic materials as well as non-magnetic materials, better results, however, being obtained when the apparatus is used with non-magnetic test pieces. It is practicable with my apparatus and method to locate a crack at a depth up to about 1½ inches in a non-magnetic casting even though the crack or inhomogeneity does not extend to the surface. In the case of magnetic materials the depth of detection is less. Thus my apparatus and method are believed to be of use in detecting defects which may be any inhomogeneities such as cracks, fissures, and blow holes in thin material such as steel propellers, thin castings, etc.

Figure 1:
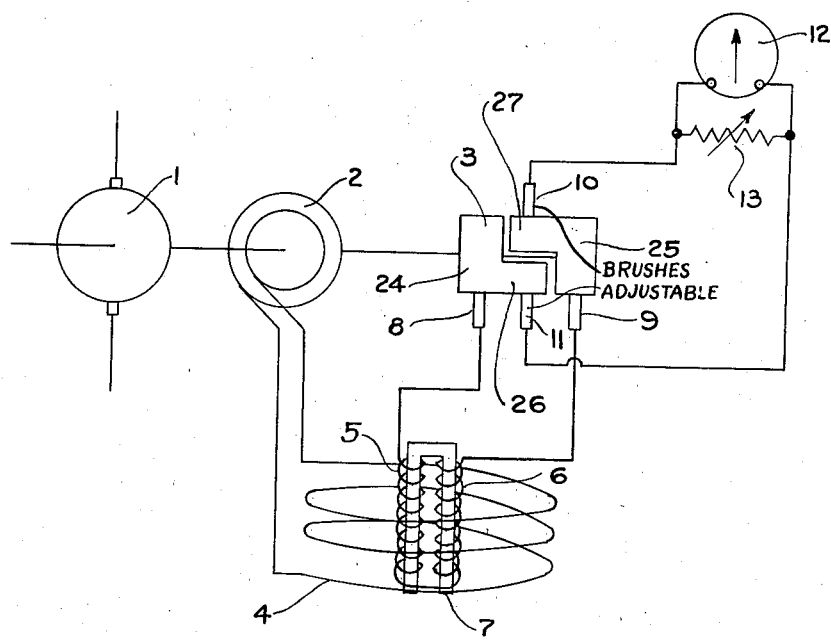
Fig. 1 is a schematic diagram of the complete apparatus.

Turning now to Fig. 1, there is shown herein a motor 1 driving an alternator 2 preferably of low frequency, and in synchronism therewith a mechanical rectifying mechanism denoted in general by the numeral 3. To the terminals of the alternator there is connected an exciting coil 4, the function of which is to induce eddy currents in the object under test. Closely associated with the exciting coil, there is positioned a pair of series connected coils 5 and 6 appropriately wound on a U-shaped core of soft iron, these coils being so positioned and wound as to be responsive to an asymmetrical distribution of the electromagnetic field accompanying the eddy currents but non-responsive to a symmetrical distribution thereof. The mechanical rectifying mechanism includes brushes 8 and 9 which are connected to the ends of the pair of coils 5, 6 and a second pair of brushes 10, 11 in circuit with a suitable indicating device 12, such as a galvanometer, for indicating an assymetrical distribution of an eddy current pattern in the object under test and, hence, the presence of a defect. The indicating device is shunted by a variable resistance 13 whereby to control its sensitivity.

The mechanical rectifying mechanism 3 as shown comprises the two insulated commutator members, the ring portions 24 and 25 of which are in continuous engagement with the brushes 8 and 9, respectively. Each of the projecting portions 26 and 27 of the commutator members is adapted to successively contact the brushes 10 and 11; and any change in phase of the current induced in the coils 5 and 6 is compensated for by adjusting the brushes 10 and 11 as a unit with respect to the projecting portions 26 and 27 of the commutator members. The feature of brush adjustability is important for, as will be explained more particularly hereinafter, a shifting of the pair of brushes to compensate for a change in phase of the current induced in the coils 5 and 6 will permit a determination of the approximate depth of a subsurface defect.

If, at the instant the alternating current induced in the coils 5 and 6 is entering upon the positive half-cycle, the brush 11 makes initial contact with the leading edge of the projecting commutator portion 26 and the potential gradient during the half-cycle is such that the brushes 8 and 9 are, respectively, plus and minus; then, there will flow in the output circuit of the mechanical rectifying mechanism a pulsating direct current which will cause a deflection of the indicator 12 in one direction either to the right or to the left depending upon how the indicator is connected in circuit. If, on the other hand, at the instant the alternating current induced in the coils 5 and 6 is entering upon its negative half-cycle, the brush 11 makes initial contact with the leading edge of the projecting commutator portion 26 and the potential gradient during this half-cycle is such that the brushes 8 and 9 are, respectively, minus and plus, then, there will flow in the output circuit of the mechanical rectifying mechanism a pulsating direct current which will cause a deflection of the indicator in a direction which is reversed to that heretofore described. When, however, the phase of the alternating current, induced in the coils 5 and 6 at the instant the brush 11 makes initial contact with the leading edge of the projecting commutator portion 26, is at its positive or negative maximum value, then, the current in the output circuit of the commutator mechanism 3 will consist of two equal and opposite half-impulses for each half-cycle of the alternating current with the result that no deflection of the indicator 12 will ensue. Any phase relation of the alternating current induced in the coils 5 and 6 intermediate the previously discussed zero and maximum current values at the instant the brush 11 contacts the leading edge of the commutator portion 26, will result in either a direct or reversed indicator deflection of lesser magnitude, the magnitude and direction of deflection depending upon the precise phase of the alternating current at the instant the brush 11 contacts the leading edge of the commutator portion 26.

It is not essential that a mechanical rectifying mechanism be employed and, instead, I may use any type of rectifier such as a copper oxide rectifier; but the results and indications will be neither as large in magnitude nor as significant as the readings obtained with the apparatus previously described.

Figure 2:
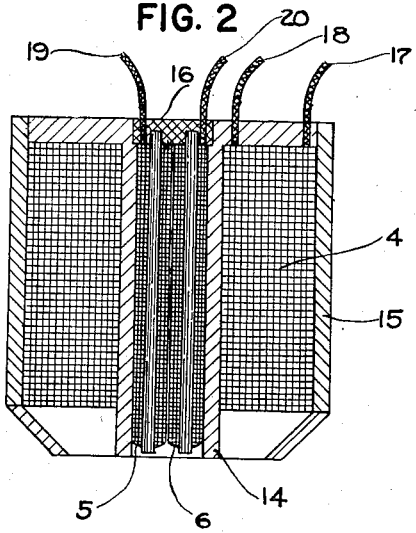
Fig. 2 shows in section one embodiment of the exploring unit forming a part of my apparatus.

The exciting coil 4 and the pair of coils 5 and 6 for detecting any asymmetry in the eddy current pattern are conveniently combined in the exploring unit shown in Fig. 2. This exploring unit includes a core 14 having wound thereabout the exciting coil 4 which in turn is surrounded by a casing 15, the casing and core being made of a magnetic material of low retentivity. In order to partially shield the coils 5 and 6 from the intense magnetic field of the exciting coil 4, the pair of coils 5 and 6 is mounted within the core 14. The coils 5 and 6 are shown wound on a U-shaped core 16, which core may be fabricated of soft iron or other suitable material. The terminals 17 and 18 of the exciting coil are connected to be energized by the alternator 2; and the terminals 19 and 20 of the pair of coils 5 and 6 are connected in circuit with the brushes 8 and 9 of the mechanical rectifying mechanism and the indicator 12.

An alternative embodiment of my exploring unit is shown in Fig. 3 and is identical with that shown in Fig. 2 except that an auxiliary coil 21 is positioned interiorly of the core 22 to further reduce the magnetic field acting upon coils 5 and 6. In general, this auxiliary coil may be connected in series with the exciting coil or, if desired, an auxiliary alternator operating in synchronism with alternator 2 may be arranged to supply current for energizing the same. If an auxiliary alternator is employed it is so arranged that the phase of the current may be adjusted to any desired value.

When it is desired to test a metallic object to determine the absence or presence of any inhomogeneity therein, the exploring unit shown in either Fig. 2 or 3 is placed upon the surface of the object to be tested. The energization of the exciting coil 4 by the alternator 2 will induce a system of eddy currents in the object their distribution depending upon the structure of the object. If the object under test is homogeneous in character, a symmetrical pattern of eddy currents as shown in Fig. 4A will be induced therein and the indicator 12 will show no deflection since the coils 5 and 6 are uniformly affected by the symmetrical electromagnetic field due to the eddy current pattern. Thus, as disclosed in Fig. 4B, there will ensue a zero indicator deflection. If, now, the exploring unit is in a zone where there is present either a surface or subsurface inhomogeneity, the symmetrical eddy current pattern will be distorted with the result that voltages are induced in the coils 5 and 6 and a deflection of the indicator ensues. Fig. 5A shows an asymmetrical distribution of the eddy currents in the vicinity of a crack 23 and therebeneath in Fig. 5B is depicted a curve showing the deflections of the indicator as the exploring unit is moved from a position on one side of the crack to a position on the other side thereof. It will be noted that as the exploring unit is moved across the crack there will first occur a deflection of predetermined magnitude in one direction which will then recede to zero as the crack is placed at a point where it approximately bisects the exploring unit, and that a further movement of the exploring unit in the same direction produces a deflection similar to that first described but in the opposite direction. Thus, where the indicator changes its direction of deflection there will be found the inhomogeneity sought.

If, now it is desired to determine the appropriate depth of a subsurface defect in an object under test or to detect any difference in depth between a plurality of subsurface defects, the following procedure is adopted. In the case of determining the approximate depth of a subsurface defect, the pair of brushes 10, 11 of the mechanical rectifying mechanism 3 is so adjusted that an indicator deflection curve of the character shown in Fig. 5B, and of maximum amplitude, is obtained when the exploring unit passes over a surface defect. As the eddy currents penetrate the material of the object under test, it is known that their phase, among other things, changes with attendant change in phase of the electromagnetic fields which they generate. Therefore, when a subsurface defect is encountered in the course of exploration the characteristic indicator deflection curve of Fig. 5B will be obtained but the amplitude of this curve will be of lesser magnitude than that obtained in the case of a surface defect. The reason for this lies in the fact that the phase of the current induced in the coils 5, 6 has changed and, as previously explained in connection with the discussion of the mechanical rectifying mechanism 3, the indicator deflection must necessarily be less. If now, with the exploring unit in juxtaposition to the subsurface defect, the pair of brushes, 10, 11 is again shifted so as to restore the maximum indicator deflection and thereby compensate for the change in phase, the amount of brush shift to accomplish this will be proportional to the depth of the subsurface defect. The proportionality factor must, of course, be empirically determined by suitable calibration. Furthermore, it is to be noted that the brush shift to reestablish the indicator deflection curve of maximum amplitude is tantamount to a comparison of the phases of the electromagnetic fields fixed by the surface and subsurface defects, respectively.

Where it is desired to determine any difference in depth between a plurality of subsurface defects, a procedure similar to the one previously described is adopted. The pair of brushes 10, 11 is positioned so as to obtain the characteristic deflection curve of maximum amplitude when the exploring unit is in the vicinity of the first defect. The diminution in amplitude of the characteristic deflection curve occasioned by the second and deeper lying subsurface defect is compensated for by shifting the pair of brushes 10, 11 as heretofore described, the shifting of the brushes being equivalent to comparing the phases of the electromagnetic fields fixed by the defects and the magnitude of the shift being proportional to the difference in depth between said defects.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

This invention may be manufactured and used by or for the Government of the United States of America for governmental purposes without payment of royalties thereon or therefor.

I claim:

1. The method of detecting any difference in depth between defects below the surface of electrically conductive objects which comprises inducing eddy currents of a predetermined distribution in a substantially homogeneous portion of the object to be tested, noting the departures from the aforementioned distribution occasioned by a plurality of defects by measuring the electromagnetic fields generated by said eddy currents and comparing the phase of the electromagnetic fields fixed by one defect with the phase of the electromagnetic fields fixed by another defect whereby to determine any difference in depth between a plurality of defects in the object.

2. The method of detecting any difference in depth between defects below the surface of elecerically conductive objects which comprises inducing a symmetrical pattern of eddy currents in a substantially homogeneous portion of the object to be tested, noting departures from the symmetry of the aforementioned pattern occasioned by a plurality of defects by measuring the electromagnetic fields generated by said eddy currents and comparing the phase of the electromagnetic fields fixed by one defect with the phase of the electromagnetic fields fixed by another defect whereby to determine any difference in depth between a plurality of defects in the object.

3. The method of determining approximately the depth of a defect below the surface of an electrically conductive object which comprises inducing eddy currents of a predetermined distribution in a substantially homogeneous portion of the object to be tested, noting the departure from the aforementioned distribution occasioned by the presence of a subsurface defect by measuring the electromagnetic fields generated by said eddy currents and comparing the phase of the electromagnetic fields fixed by said subsurface defect with the known phase of electromagnetic fields fixed by a surface defect whereby to effect an approximate determination of the depth of the defect below the surface of the object.

4. A device for detecting defects in electrically conductive objects comprising means for inducing eddy currents in the object to be tested, means inductively positioned with respect to the electromagnetic fields generated by said eddy currents and nonresponsive to a symmetrical distribution of said eddy currents but responsive to an asymmetrical distribution thereof occasioned by the presence of a defect in the object, said second mentioned means being connected in circuit with a rectifying means and with an indicating means for indicating the presence of an asymmetrical distribution of eddy currents and hence the presence of a defect in said object.

5. A device for detecting defects in electrically conductive objects comprising means for producing and utilizing an alternating current to induce eddy currents in the object to be tested, means inductively positioned with respect to the electromagnetic fields generated by said eddy currents and nonresponsive to a symmetrical distribution of said eddy currents but responsive to an asymmetrical distribution thereof occasioned by the presence of a defect in the object, said second mentioned means being connected in circuit with a mechanical rectifying mechanism operating in synchronism with the alternating current and with an indicating means for indicating the presence of an asymmetrical distribution of eddy currents and hence the presence of a defect in said object.

6. A device for detecting defects in electrically conductive objects comprising means for producing and utilizing an alternating current to induce eddy currents in the object to be tested, means inductively positioned with respect to the electromagnetic fields generated by said eddy currents and nonresponsive to a symmetrical distribution of said eddy currents but responsive to an asymmetrical distribution thereof occasioned by the presence of a defect in the object, said second mentioned means being connected in circuit with a mechanical rectifying mechanism operating in synchronism with the alternating current and with an indicating means for indicating the presence of an asymmetrical distribution of eddy currents and hence the presence of a defect in said object, said mechanical rectifying mechanism including adjustable means whose position may be changed to compensate for a phase shift in the eddy currents occasioned by the presence of a subsurface defect, the magnitude of change in the positioned of said means being proportional to the depth of the defect below the surface of the object to be tested.

7. A device for detecting defects in electrically conductive objects comprising a source of alternating current, an exciting coil energizable by said source of alternating current for inducing eddy currents in the object to be tested, means including a pair of coils inductively positioned with respect to the electromagnetic fields generated by said eddy currents and nonresponsive to a symmetrical distribution of said eddy currents but responsive to an asymmetrical distribution thereof occasioned by the presence of a defect in the object, a mechanical rectifying mechanism adapted to be operated in synchronism with the alternating current, and an indicating means for indicating the presence of an asymmetrical distribution of eddy currents and hence the presence of a defect in said object, said rectifying mechanism being electrically connected to the indicating means and to the pair of coils of said first mentioned means and including means operable to adjust the rectifying mechanism to an in-phase relation with respect to the current induced in said pair of coils.

8. A device for detecting defects in electrically conductive objects comprising a source of low frequency alternating current, an exciting coil energizable by said source of alternating current for inducing eddy currents in the object to be tested, means including a pair of coils inductively positioned with respect to the electromagnetic fields generated by said eddy currents and non-responsive to a symmetrical distribution of said eddy currents but responsive to an asymmetrical distribution thereof occasioned by the presence of a defect in the object, said pair of coils and exciting coil being symmetrically mounted with respect to a common axis and movable as a unit with respect to the object to be tested, a mechanical rectifying mechanism adapted to be operated in synchronism with the alternating current, and an indicating means for indicating the presence of an asymmetrical distribution of eddy currents and hence the presence of a defect in said object, said rectifying mechanism being electrically connected to the indicating means and to the pair of coils of said first mentioned means and including a pair of adjustable brushes operable to adjust the rectifying mechanism to an in-phase relation with respect to the current induced in said pair of coils.

9. A device for detecting defects in electrically conductive objects comprising an exploring unit, said unit including an exciting coil for inducing eddy currents in the object to be tested, a pair of coils inductively positioned with respect to the electromagnetic fields generated by said eddy currents and nonresponsive to a symmetrical distribution of said eddy currents but responsive to an asymmetrical distribution thereof occasioned by the presence of a defect in the object, and means partially shielding the pair of coils from the magnetic field of said exciting coil, a source of alternating current for energizing said exciting coil and means connected in circuit with the pair of coils for determining the presence of an asymmetrical distribution of eddy currents and, hence, the presence of a defect in the object to be tested.

10. A device for detecting defects in electrically conductive objects comprising an exploring unit, said unit including an exciting coil for inducing eddy currents in the object to be tested, a pair of coils arranged about a U-shaped soft iron core within the exciting coil and inductively positioned with respect to the electromagnetic fields generated by said eddy currents and nonresponsive to a symmetrical distribution of said eddy currents but responsive to an asymmetrical distribution thereof occasioned by the presence of a defect in the object, and means partially shielding the pair of coils from the magnetic field of said exciting coil, a source of low frequency alternating current for energizing said exciting coil and means connected in circuit with the pair of coils for determining the presence of an asymmetrical distribution of eddy currents and, hence, the presence of a defect in the object to be tested, said last mentioned means including a mechanical rectifying mechanism operating in synchronism with the alternating current.

11. A device for detecting defects in electrically conductive objects comprising an exploring unit, said unit including an exciting coil for inducing eddy currents in the object to be tested, a pair of coils inductively positioned with respect to the electromagnetic fields generated by said eddy currents and non-responsive to a symmetrical distribution of said eddy currents but responsive to an asymmetrical distribution thereof occasioned by the presence of a defect in the object, an auxiliary coil designed and positioned to reduce the effective field acting upon said pair of coils, and means partially shielding the pair of coils from the magnetic field of said exciting coil, alternating current means for energizing said exciting and auxiliary coils and means connected in circuit with the pair of coils for determining the presence of an asymmetrical distribution of eddy currents and, hence, the presence of a defect in the object to be tested.

12. A device for detecting defects in electrically conductive objects comprising an exploring unit, said unit including an exciting coil for inducing eddy currents in the object to be tested, a pair of coils arranged about a U-shaped soft iron core within the exciting coil and inductively positioned with respect to the electromagnetic fields generated by said eddy currents and non-responsive to a symmetrical distribution of said eddy currents but responsive to an asymmetrical distribution thereof occasioned by the presence of a defect in the object, an auxiliary coil designed and positioned to reduce the effective field acting upon said pair of coils and means partially shielding the pair of coils from the magnetic field of said exciting coil, low frequency alternating current means for energizing said exciting and auxiliary coils, and means connected in circuit with the pair of coils for determining the presence of an asymmetrical distribution of eddy currents and, hence, the presence of a defect in the object to be tested, said last mentioned means including a mechanical rectifying mechanism operating in synchronism with the alternating current.

13. An apparatus for detecting defects in electrically conductive objects comprising means for producing and utilizing a varying current to induce eddy currents of a predetermined distribution in a substantially homogeneous portion of the object to be tested and means responsive to the electromagnetic fields generated by said eddy currents for determining any departure from the aforementioned eddy current distribution whereby to indicate the presence of a defect in said object.

14. An apparatus for detecting defects in electrically conductive objects comprising means for producing and utilizing an alternating current to induce a symmetrical pattern of eddy currents in a substantially homogeneous portion of the object to be tested and means responsive to the electromagnetic fields generated by said eddy currents for determining any departure from the symmetry of the aforementioned eddy current pattern whereby to indicate the presence of a defect in said object.

15. The method of detecting defects in electrically conductive objects which comprises producing a varying current, causing the electromagnetic field accompanying said current to induce eddy currents of a predetermined distribution in a substantially homogeneous portion of the object to be tested and noting any departure from the aforementioned distribution by ascertaining the character of the electromagnetic fields generated by said eddy currents to thereby indicate the presence of a defect in said object.

16. The method of detecting defects in electrically conductive objects which comprises producing an alternating current, causing the electromagnetic field accompanying said current to induce a symmetrical pattern of eddy currents in a substantially homogeneous portion of the object to be tested and noting any departure from the symmetry of the aforementioned pattern by measuring the electromagnetic fields generated by said eddy currents to thereby indicate the presence of a defect in said object.

17. A device for detecting defects in electrically conductive objects comprising means for producing and utilizing a varying current to induce eddy currents in the object to be tested, means inductively positioned with respect to the electromagnetic fields generated by said eddy currents and non-responsive to a predetermined distribution of said eddy currents but responsive to any departure from the aforesaid distribution occasioned by the presence of a defect in the object, and means associated with said second mentioned means for determining any departure of the eddy currents from the aforesaid distribution and hence the presence of a defect in said object.

18. A device for detecting defects in electrically conductive objects comprising means for producing and utilizing a varying current to induce eddy currents in the object to be tested, means inductively positioned with respect to the electromagnetic fields generated by said eddy currents and non-responsive to a predetermined distribution of said eddy currents but responsive to any departure from the aforesaid distribution occasioned by the presence of a defect in the object, and means associated with said second mentioned means for determining any departure of the eddy currents from the aforesaid distribution and hence the presence of a defect in said object, said last mentioned means including a rectifying means.

19. A device for detecting defects in electrically conductive objects comprising means for producing and utilizing an alternating current to induce eddy currents in the object to be tested, means inductively positioned with respect to the electromagnetic fields generated by said eddy currents and non-responsive to a predetermined distribution of said eddy currents but responsive to any departure from the aforesaid distribution occasioned by the presence of a defect in the object, and means associated with said second mentioned means for determining any departure of the eddy currents from the aforesaid distribution and hence the presence of a defect in said object, said last mentioned means including a rectifier adapted to be operated in synchronism with the alternating current and provided with means operable to adjust the rectifier to an in-phase relation with respect to any current induced in said second mentioned means.

20. A device for detecting defects in electrically conductive objects comprising means for producing and utilizing an alternating current to induce eddy currents in the object to be tested, means inductively positioned with respect to the electromagnetic fields generated by said eddy currents and non-responsive to a predetermined distribution of said eddy currents but responsive to any departure from the aforesaid distribution occasioned by the presence of a defect in the object, and means associated with said second mentioned means for determining any departure of the eddy currents from the aforesaid distribution and hence the presence of a defect in said object, said last mentioned means including a rectifier adapted to be operated in synchronism with the alternating current and provided with a pair of adjustable brushes the position of which may be changed to compensate for a phase shift in the eddy currents attending their penetration to a sub-surface defect, the magnitude of change in the brush position being proportional to the depth of the defect below the surface of the object to be tested.

21. The method of determining approximately the depth of a defect below the surface of an electrically conductive object which comprises inducing eddy currents of a predetermined distribution in a substantially homogeneous portion of the object to be tested, noting the departure from the aforementioned distribution occasioned by the presence of a sub-surface defect and ascertaining the change in phase of the eddy currents occasioned by their penentration to the defect whereby to effect an approximate determination of the depth of the defect below the surface of the object.

22. The method of determining approximately the depth of a defect below the surface of an electrically conductive object which comprises inducing eddy currents in the object to be tested and ascertaining the change in phase of the said eddy currents occasioned by their penetration to the defect whereby to effect an approximate determination of the depth of the defect below the surface of the object.

23. A device for detecting defects in electrically conductive objects comprising an exploring unit, said unit including means for inducing eddy currents in the object to be tested, means inductively positioned with respect to the electromagnetic fields generated by said eddy currents and non-responsive to a predetermined distribution of said eddy currents but responsive to any departure from the aforesaid distribution occasioned by the presence of a defect in the object, and means for reducing the effect of the electromagnetic field accompanying said first mentioned means on said second mentioned means, a source of variable current for energizing said first mentioned means and means associated with said second mentioned means for determining any departure of said eddy currents from the aforesaid distribution and hence the presence of a defect in the object to be tested.

ROSS GUNN.